United States Patent [19]
Sanderfoot

[11] Patent Number: 6,088,945
[45] Date of Patent: Jul. 18, 2000

[54] ICE FISHING SYSTEM

[75] Inventor: Gerald J. Sanderfoot, Hortonville, Wis.

[73] Assignee: Joni Lu Sorcic, Hortonville, Wis.

[21] Appl. No.: 09/299,978

[22] Filed: Apr. 27, 1999

Related U.S. Application Data

[60] Provisional application No. 60/084,145, May 4, 1998.

[51] Int. Cl.[7] .................................................. A01K 97/01
[52] U.S. Cl. ........................ 43/4; 43/4.5; 43/17; 43/19.2; 126/271.1
[58] Field of Search .............................. 43/4, 4.5, 17, 16, 43/19.2; 126/271.1, 271.2, 271.3

[56] References Cited

U.S. PATENT DOCUMENTS

| | | | |
|---|---|---|---|
| 2,483,787 | 10/1949 | Sheraski | 126/271.3 |
| 2,618,091 | 11/1952 | Sheraski | 43/17 |
| 2,643,478 | 6/1953 | Paulsen | 43/19.2 |
| 2,883,784 | 4/1959 | Obernolte | 43/4 |
| 3,025,852 | 3/1962 | Quilling | 126/271.2 |
| 3,030,122 | 4/1962 | Madera | 126/271.3 |
| 3,031,790 | 5/1962 | Duryea | 43/19.2 |
| 3,105,487 | 10/1963 | Anderson | 126/271.3 |
| 3,170,458 | 2/1965 | Anderlie | 126/271.3 |
| 3,171,404 | 3/1965 | Skog | 126/271.3 |
| 3,387,401 | 6/1968 | Stelmach | 43/17 |
| 3,470,647 | 10/1969 | Horner | 43/17 |
| 3,545,118 | 12/1970 | Stelmach | 43/17 |
| 3,550,302 | 12/1970 | Creviston et al. | 43/16 |
| 3,568,352 | 3/1971 | Hill | 43/17 |
| 3,600,837 | 8/1971 | Bristol | 43/19.2 |
| 4,021,958 | 5/1977 | Snodie | 43/17 |
| 4,253,262 | 3/1981 | Johnson | 43/17 |
| 4,270,297 | 6/1981 | Yates | 43/4 |
| 4,285,154 | 8/1981 | Grahl | 43/17 |
| 4,373,287 | 2/1983 | Grahl | 43/17 |
| 4,642,930 | 2/1987 | Graf | 43/19.2 |
| 4,651,459 | 3/1987 | Wurtz | 43/16 |
| 4,662,099 | 5/1987 | Stewart | 43/17 |
| 4,680,885 | 7/1987 | Lindell et al. | 43/19.2 |
| 4,779,371 | 10/1988 | Braud | 43/19.2 |
| 4,787,166 | 11/1988 | Vogt et al. | 43/17 |
| 4,845,878 | 7/1989 | Hackel | 43/17 |
| 4,945,668 | 8/1990 | Keller | 43/17 |
| 4,953,317 | 9/1990 | Ruchel | 43/17 |
| 4,980,986 | 1/1991 | Harper | 43/17 |
| 4,996,788 | 3/1991 | Wieting et al. | 43/17 |
| 5,044,154 | 9/1991 | Rinehart | 43/17 |
| 5,056,255 | 10/1991 | Campbell | 43/19.2 |
| 5,074,072 | 12/1991 | Serocki et al. | 43/17 |
| 5,231,784 | 8/1993 | Condusta | 43/19.2 |
| 5,282,333 | 2/1994 | Klinkhamer | 43/4 |
| 5,448,849 | 9/1995 | Burgett | 43/17 |
| 5,540,010 | 7/1996 | Aragona | 43/19.2 |
| 5,598,656 | 2/1997 | Strasser | 43/17 |

*Primary Examiner*—Michael J. Ccrone
*Assistant Examiner*—Darren W. Ark
*Attorney, Agent, or Firm*—Donald Cayen

[57] ABSTRACT

An ice fishing system comprising a variable stiffness jigging mechanism inside a housing. The jigging mechanism includes an oscillating arm having a flexible tube that supports and jigs the fishing line. The fishing line is draped over a flexible line guide. The flexibilities of the flexible tube and the line guide are chosen to suit the particular kind of fish to be caught. A heat exchanger in the housing has a slidable glass door that protects a burner from the wind as well as provides illumination inside the housing. The heat exchanger is spaced from the housing walls to provide adequate air circulation around it. A lid of the housing is strong enough for a fisherman to kneel on.

37 Claims, 4 Drawing Sheets

ICE FISHING SYSTEM

This is a continuation-in-part of copending application(s) Ser. No. 60/084145 filed on May 4, 1998.

BACKGROUND OF THE INVENTION

1. Field of the Invention

This invention pertains to fishing, and more particularly to apparatus that makes ice fishing much more convenient and successful than prior ice fishing equipment.

2. Description of the Prior Art

Various types of equipment have been developed to aid fishermen fish through the ice. For example, several kinds of tipups are well known and are in widespread use. By way of example, relatively simple tipups in which the working elements are exposed to the atmosphere may be seen in U.S. Pat. Nos. 4,253,262; 4,270,297; and 4,373,287.

To render bait more lifelike and thus improve fishing success, it is known to jiggle the bait. Some jigging apparatus oscillates a pole from which the fishing line is strung. Examples of oscillating poles are shown in U.S. Pat. Nos. 3,600,837; 4,642,930; 5,056,255; and 5,540,010. Other jigging apparatus operates to move only the fishing line directly without moving the fishing pole or other components that hold the fishing line. U.S. Pat. Nos. 3,550,302 and 4,680,885, for example, describe arms that oscillate to reciprocate a fishing line without moving the fishing pole. The latter type of jigging device is preferred because it provides increased sensitivity to bait movement compared with moving an entire fishing pole.

A further refinement in ice fishing apparatus is a housing that covers the hole in the ice. The housing contains the fishing gear itself, such as a reel, as well as portions of a signaling device. The housing is also useful for preventing the hole in the ice from freezing over. To prevent ice hole freezing, it is known to incorporate a candle or petroleum lamp into the housing. Examples of housings with interior heaters include U.S. Pat. Nos. 4,787,166; 4,945,668; 4,980,986; and 5,598,656.

Despite the large number of existing ice fishing equipment, there nevertheless is need for improvement to them.

SUMMARY OF THE INVENTION

In accordance with the present invention, an ice fishing system is provided that includes more desirable features then were previously available. This is accomplished by apparatus that includes a housing that encloses a variable stiffness fishing line jigger and a heat exchanger.

The housing may be cylindrical in shape, having an open bottom. A door or lid is hinged to the housing so as to selectively permit access to the housing interior. In one embodiment of the invention, the housing is comprised of four vertical walls, a top wall, and a strong lid. The lid is hinged on a front wall in a manner that enables a fisherman to kneel on the lid when it is open. The lid has a window that enables the fisherman to see inside the housing. The housing does not have a floor. Rather, there is a pad in each of the housing corners that extends below the common lower surface of the four walls. The housing pads rest on the ice during use when the housing is over the fishing hole.

Suspended from the housing top wall is a reel assembly that includes the fishing line. The reel assembly is comprised of a sleeve that passes through the housing top wall. The sleeve is adjustably held in position by a set screw. A shaft is rotatable inside the sleeve. A trip bar is assembled on the upper end of the shaft, which is outside of the housing. The lower end of the shaft is inside the housing. The fishing line is wound on a reel that is mounted to the lower end of the shaft. The fishing line is strung horizontally from the reel to a line guide that is hung from the housing top wall. The fishing line drapes over the line guide and descends vertically through the hole in the ice. When a fish pulls the line, the line rotates the reel, shaft, and trip bar together. The line guide is flexible so as to yield when a fish makes a hard strike on the bait.

Also on the outside of the housing top wall is a mechanical strike alert. The mechanical strike alert is composed of a spring that is secured at one end to the housing top wall. A long post is attached at one end thereof to the spring second end. On the post second end is a flag. The spring is normally undeflected such that the spring and post are vertical. However, the spring can be manually bent to place the post in a generally horizontal attitude and under the trip bar. When a fish strikes the bait and pulls the fishing line, the trip bar rotates with the reel and shaft to release the post. The spring returns to its undeflected condition, swinging the post and flag to the vertical and thereby alerting the fisherman of the strike. When the spring is in the undeflected condition, it makes contact with a metallic conductor that is part of an electric circuit. The circuit includes a lamp on the housing that is energized when the circuit is closed by the contact between the spring and the metallic conductor.

Further in accordance with the present invention, the fishing line is reciprocated vertically by a variable stiffness jigging mechanism. The jigging mechanism is composed of an electric motor that drives a crank and slotted rod. The slotted rod is pivotally connected at one end to the housing. The distal end of the rod receives any of several different pieces of flexible tubing. One end of the tubing fits snugly over the rod. The second end of the tubing is slit diametrically through. The fishing line is placed in the slit. A marker is tied to the fishing line immediately above the tubing. The weight of the fishing line and bait components are supported by the tubing, on which the marker rests. When the motor is activated, the slotted rod and tubing oscillate to reciprocate the fishing line. Using tubing of different stiffnesses enables the jigging mechanism to suit the feeding habits of different fish. The motor can be programmed to activate intermittently and at different speeds.

According to another aspect of the invention, a heat exchanger is supported inside the housing. The heat exchanger comprises a chamber defined by side plates, a top plate, and a bottom plate. The two chamber side plates are spaced from the housing wall. There is a middle shelf between the top and bottom plates. The bottom plate and middle shelf have several holes through them. There is a rectangular partial front plate that covers the front of the chamber between the top plate and the middle shelf. The chamber side plates, top plate, front plate, and middle shelf cooperate to define a hood above the middle shelf. The side, top, and bottom plates, as well as the shelf and the partial front plate are made of highly polished metal. A small burner is placed on the chamber bottom plate.

The front of the heat exchanger chamber between the bottom plate and the middle shelf is normally closed by a glass door. The glass door is slidable upwardly. Sliding the door upwardly opens part of the front of the chamber between the middle shelf and the bottom plate.

In normal operation, the glass door is in a lower position. Light from the burner passes through the glass door to illuminate the interior of the housing. The polished surfaces of the heat exchanger plates and middle shelf aid in reflecting light into the housing. Heat from the burner flows upwardly through the holes in the middle shelf into the hood, from which the heat radiates to the various components inside the housing. Heat also radiates from the heat exchanger plates.

To control the amount of air that enters the housing and is thus available to the burner, a vent is incorporated into the housing. The vent is adjustable by means of a slide built into the housing wall. The space between the heat exchanger side plates and the adjacent housing wall promote air movement around the heat exchanger, especially the hood, for efficient heat transfer from the heat exchanger to the air inside the housing.

The method and apparatus of the invention, using a direct variable stiffness fishing line jigger and a heat exchanger, thus combine effective ice fishing with convenience. The probability of catching fish is increased using the invention, even though the fisherman need not give the system his constant attention.

Other advantages, benefits, and features of the present invention will become apparent to those skilled in the art upon reading the detailed description of the invention.

DETAILED DESCRIPTION OF THE PREFERRED EMBODIMENT

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Figure 1:
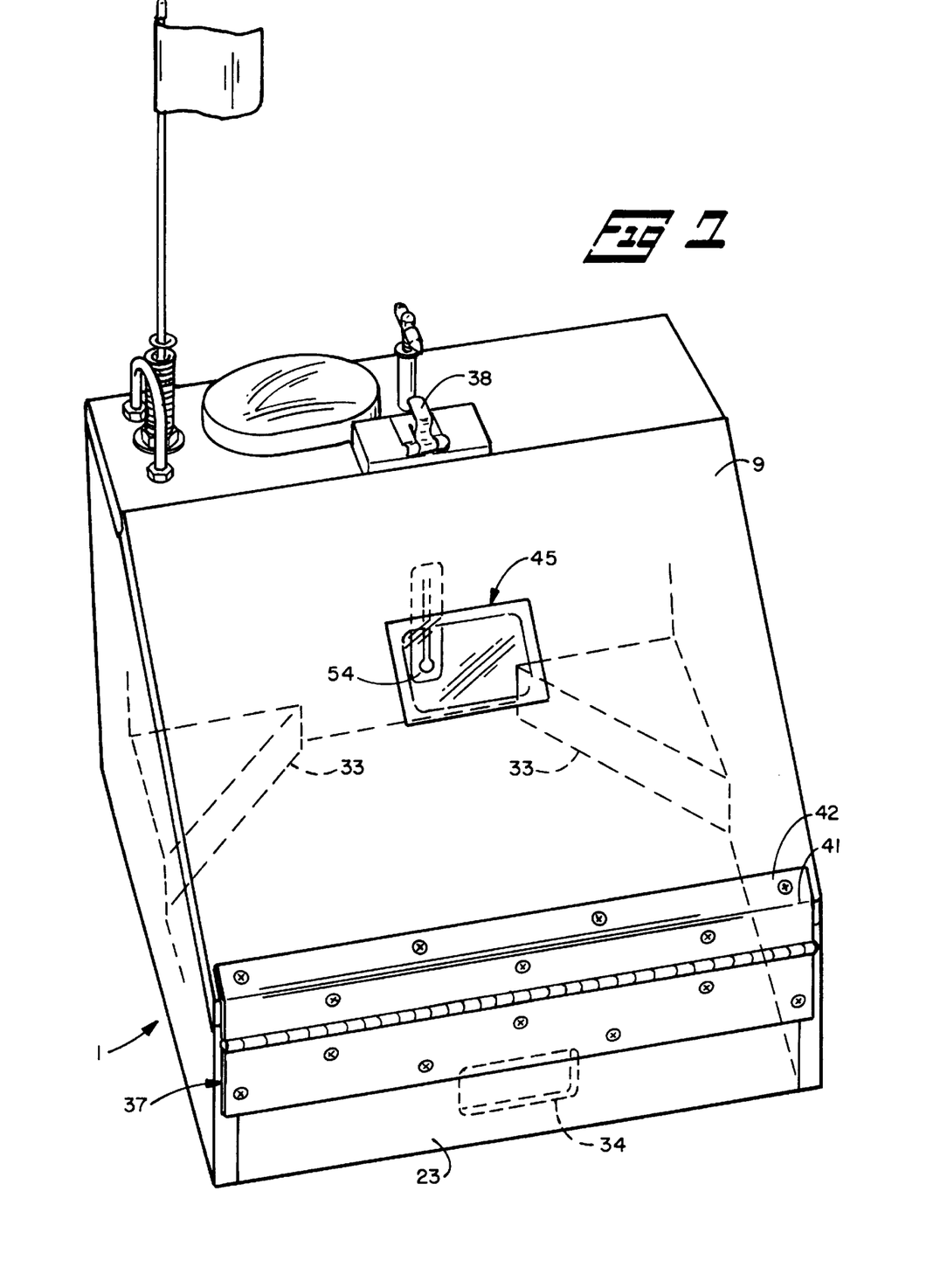
FIG. 1 is a perspective view of the invention showing the lid closed and the mechanical strike alert in a vertical attitude.
Figures 2, 8:
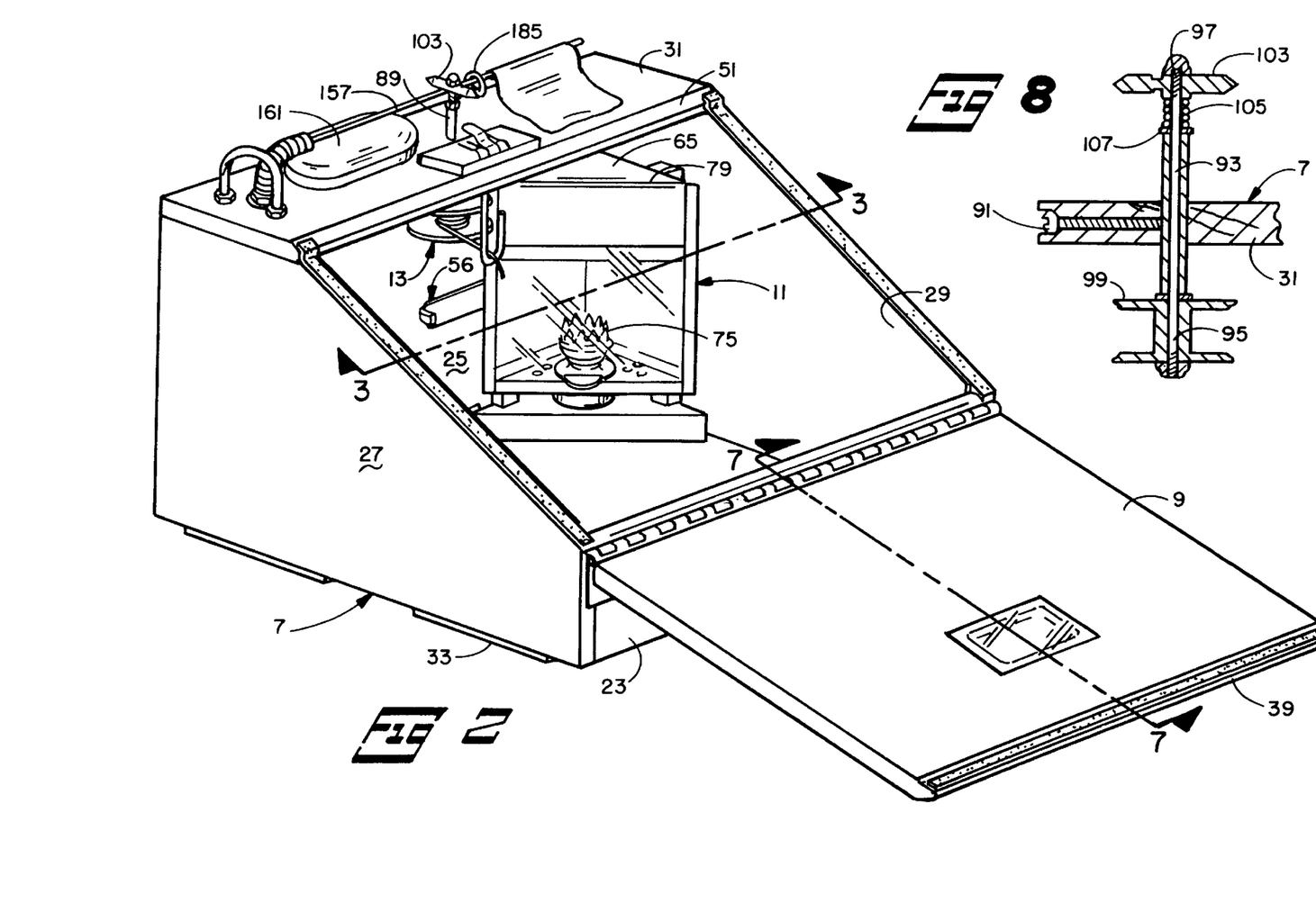
FIG. 2 is a perspective view of the invention showing the lid open and the mechanical strike alert in a horizontal attitude.
FIG. 8 is a cross sectional view taken along line 8—8 of FIG. 3.
Figure 3:
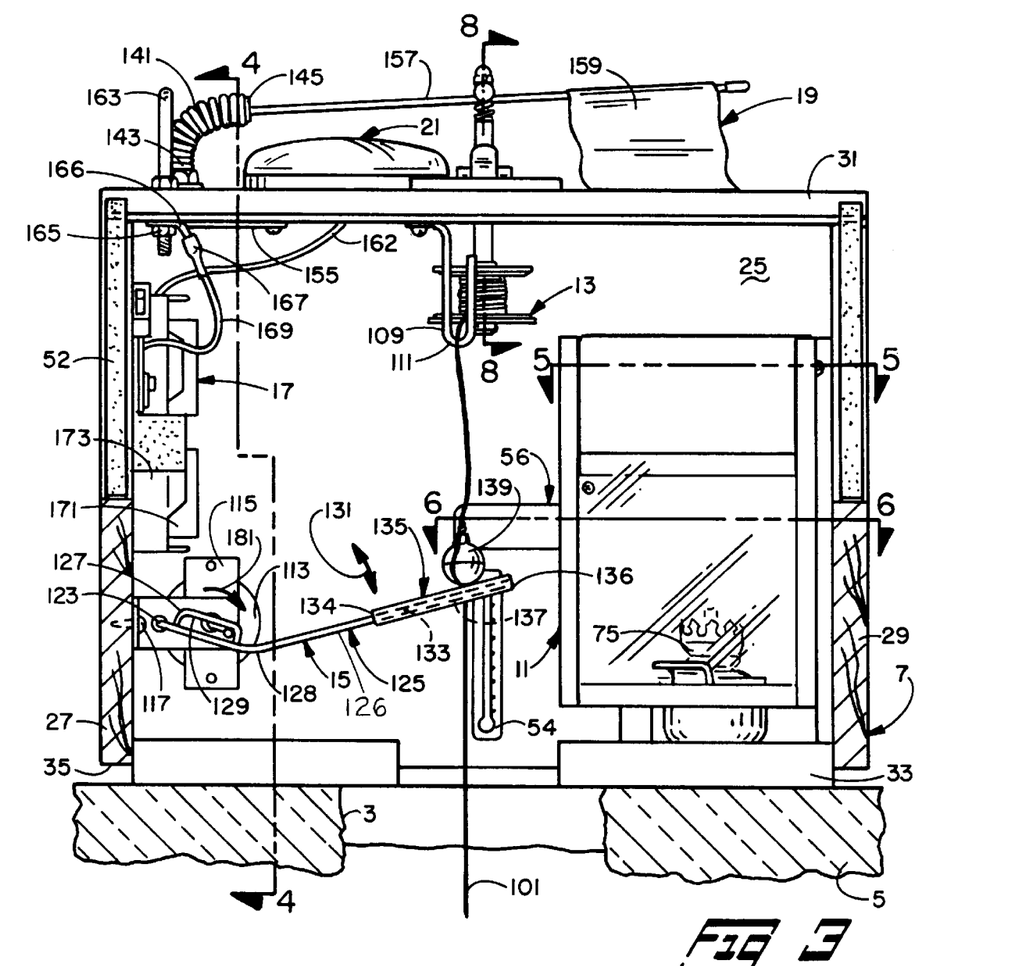
FIG. 3 is a cross sectional view taken along line 3—3 of FIG. 2.

Referring first to FIGS. 1–3, an ice fishing system 1 is illustrated that includes the present invention. The ice fishing system 1 is particularly useful for unattended fishing through a hole 3 in ice 5 covering a river or lake.

General

The ice fishing system 1 is comprised of a housing having a swingable door or lid. The housing encloses a heat exchanger 11, a fishing line reel mechanism 13, a fishing line jigging mechanism 15, and an electrical control 17. On the outside of the housing is a mechanical alert 19 as well as an electrical alert 21. The reel mechanism 13, jigging mechanism 15, electrical control 17, mechanical alert 19, and electrical alert 21 are all interrelated in a manner that enables the ice fishing system to increase the probability of fishing success. The heat exchanger 11 further contributes to the successful and convenient operation of the ice fishing system.

Housing

In the particular construction illustrated, the housing 7 is rectangular in shape, having a front wall 23, back wall 25, left side wall 27, right side wall 29, and top wall 31. However, the ice fishing system 1 of the invention contemplates housings of other shapes, such as cylindrical. For housings of all shapes, the bottom of the housing is substantially open. For the rectangular housing 7, I prefer that there be four triangular shaped pads 33 in the four interior corners of the housing. Also see FIGS. 4 and 5. The pads 33 extend below the common bottom surface 35 of the front, back, and side walls. Accordingly, the pads are in contact with the ice 5 during use of the ice fishing system 1. That feature decreases the wicking effect that would be present if the housing bottom surface 35 were placed directly on the ice. There is a recess 34 in the inside surface 36 of the housing front wall 23, FIGS. 1 and 7. The recess 34 is useful for a finger grip when carrying the ice fishing system. A preferred material for the housing walls is wood. Pressure treated plywood works very well. Wood is also satisfactory for the pads 33 and lid 9. Satisfactory dimensions for the housing are approximately 16 inches wide, 11 inches high, and 16 inches deep. The lid can be approximately 12 inches long.

Figure 7:
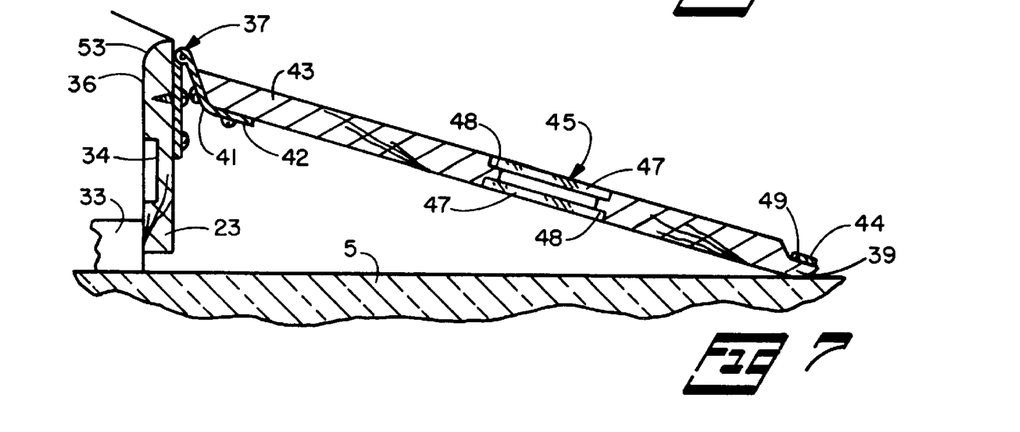
FIG. 7 is a cross sectional view taken along line 7—7 of FIG. 2.

The lid 9 is hinged to the housing front wall 23 by a hinge 37. The lid is swingable between a closed configuration as shown in FIG. 1, and an open configuration as shown in FIGS. 2 and 7. When the lid is in the open configuration, its free end 39 rests on the ice 5. To achieve that configuration, the hinge 37 has a bend 41 and an angled section 42 that conform to the angled shape of the lid hinge end 43. When the lid is in the open configuration, it can serve as a kneeling pad for a fisherman. The hinge with the angled section 42 has more than adequate strength to support the weight of a kneeling person.

In the lid 9 is a window 45. I prefer a double paned window 45 with two clear panes 47. The panes 47 are set into respective recesses 48 in opposite sides of the lid. The window is of relatively small size, approximately two inches by three inches. That size is large enough for a person to see into the housing 7 when the lid is in the closed configuration of FIG. 1, but small enough so it does not diminish the strength of the lid for supporting a kneeling fisherman.

It will be noted in FIG. 7 that the free end 39 of the lid 9 is formed with a notch 49. The lid notch 49 mates with a bevel 51 on the front edge of the housing top wall 31. The lid notch 49 and housing top wall bevel 51 cooperate to form a good weather seal when the lid is in the closed configuration. As a related feature, the top surface 53 of the housing front wall 23 has a large radius that stops moisture-related ice build up. Strips 52 of foam are bonded to the sloped edges 46 of the housing side walls 27 and 29. Another foam strip 44 is bonded in the notch 49 of the lid. The strips 52 and 44 contribute to keep water, ice, and snow out of the housing 7 when the lid is closed. There is a large block 50 of foam bonded to the inside of the housing wall 27. In the back wall 25 of the housing is a thermometer 54. The thermometer 54 is so located that it is easily seen by a person looking through the window 45 in the lid.

Figure 6:
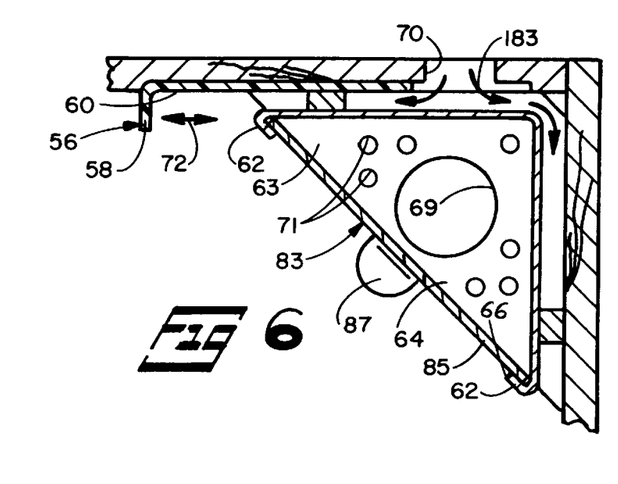
FIG. 6 is a cross sectional view taken along line 6—6 of FIG. 3.

Also in the housing back wall 25 is a vent 56, as best shown in FIGS. 2 and 6. The vent 56 includes an elongated slide 58 that fits in a recess 60 in the housing back wall. There is an opening 70 through the back wall that communicates with the recess 60. By sliding the slide 58 in the directions of arrows 72, the opening 70 can be uncovered, as shown in FIG. 6, or the opening can be shut.

Heat Exchanger

Looking especially at FIGS. 2, 3, 5, and 6, the heat exchanger 11 is located above a pad 33 of the housing 7. The heat exchanger is constructed with a first side plate 55 and a second side plate 57, both of which are preferably rectangular in shape. As illustrated, the first side plate 55 is parallel to the housing back wall 25. The second side plate 57 is parallel to the housing side wall 29. The two side plates 55 and 57 are spaced from the housing walls 25 and 29, respectively, by spacers 59, thereby forming an air passage 61. Screws 68 fasten the side plates to the housing walls. The free edges of the side plates are bent over into inwardly facing coplanar tabs 62.

The heat exchanger 11 further includes a bottom plate 63, a top plate 65, and a middle shelf 67, all of which are joined to the side plates 55 and 57, and all of which are preferably triangularly shaped. The bottom plate 63 defines a large central hole 69 and several smaller holes 71. The middle shelf 67 defines several relatively small holes 73. An oil burner 75 is removably placed in the bottom plate hole 69. The side and bottom plates, the middle shelf, and the tabs 62 define a combustion chamber 64 having an open front 66.

There is a front plate 77 between the top plate 65 and the middle shelf 67. The front plate 77 is parallel to the tabs 62 and is spaced inwardly from them. The front plate may be an integral piece with th e top plate, the piece being bent along line 79. The side plates 55 and 57, middle shelf 67, top plate 65, and front plate 77 define a hood 81 above the combustion chamber 64. The side, top, bottom, and top plates, as well as the middle shelf, are all made of highly polished metal.

Closing the front 66 of the combustion chamber 64 is a door 83. The door 83 is made of a glass pane 85 that fits in the spaces between the side plate tabs 62 and the front plate 77. At the lower end of the glass pane 85 is a handle 87. The door is slidable by gravity to a lower position whereat the pane 85 completely covers the combustion chamber front 66, as is shown in the drawings. Alternately, the door can be raised by the handle 87 such that the lower portion of the combustion chamber front is open near the bottom plate 63.

Reel Mechanism

Now turning to FIGS. 2, 3, and 8, the reel mechanism 13 will be described. In the preferred embodiment, the reel mechanism is comprised of a sleeve 89 that passes rather loosely vertically through a hole in the housing top wall 31. The vertical position of the sleeve 89 is adjustably held by a set screw 91. Rotatably received in the sleeve is a shaft 93. The lower end 95 of the shaft 93 is inside the housing 7, and the upper end 97 of the shaft is outside the housing. Mounted to the lower end 95 of the shaft is a reel 99. A fishing line 101 is wound on the reel 99. A trip bar 103 is assembled to the upper end 97 of the shaft. A spring 105 is interposed between the trip bar 103 and a washer 107 that rests on top of the sleeve. The weight of the reel, shaft, and trip bar is supported by the spring 105 on the sleeve.

A line guide 109 is suspended from the housing top wall 31 near the reel 99. The line guide 31 is made from a flexible material such as spring rated piano wire. The line guide has a bight 111 that is slightly lower than the level of the reel. The fishing line 101 wound on the reel is strung from the reel, drapes over the line guide bight 111, and enters the fishing hole 3. The line guide has sufficient flexibility so as to produce a selected amount of bending in the direction toward the reel when a fish makes a hard strike on the bait.

Jigging Mechanism

Figure 4:
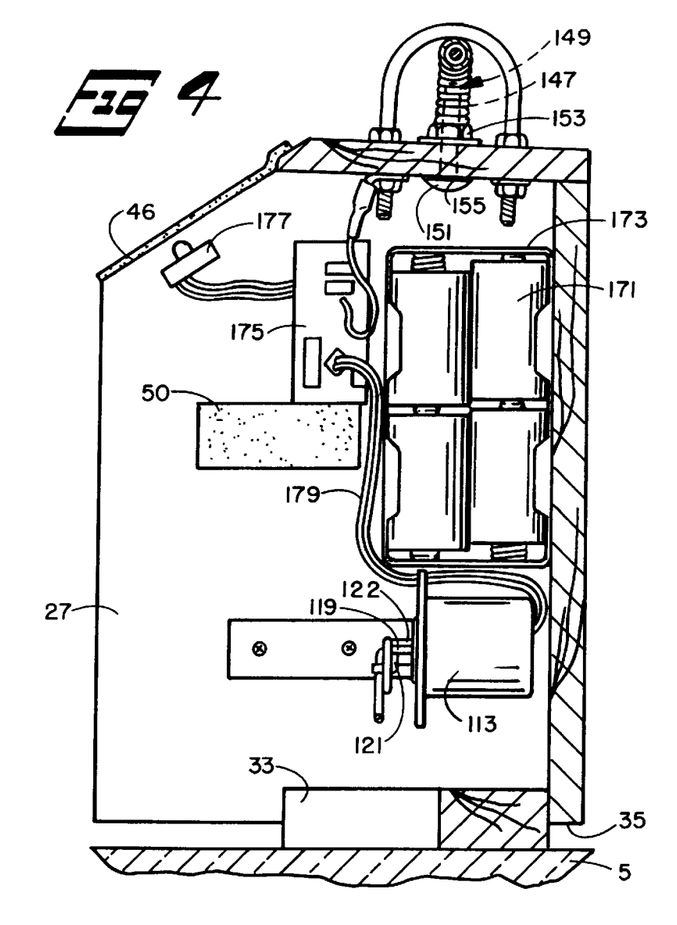
FIG. 4 is a cross sectional view taken along line 4—4 of FIG. 3.
Figure 5:
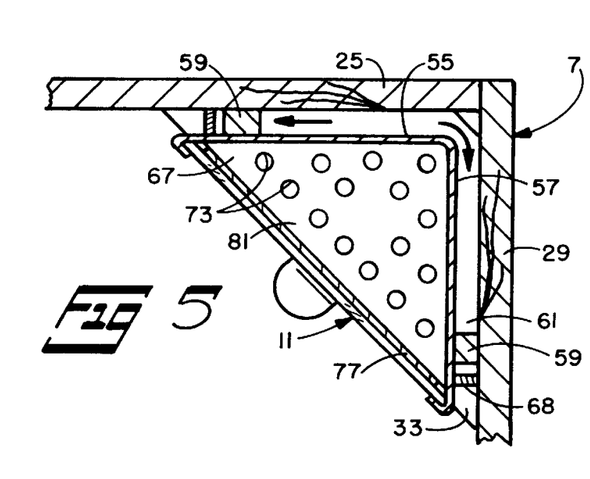
FIG. 5 is a cross sectional view taken along line 5—5 of FIG. 3.

The jigging mechanism 15 is best shown in FIGS. 3 and 4. The jigging mechanism reciprocates the fishing line 101 in the vertical direction without having any effect on the reel mechanism 13. In the illustrated construction, the jigging mechanism is comprised of an electric motor 113 fastened to a bracket 115. In turn, the bracket 115 is joined to the housing wall 27 by screws 117. The motor shaft 119 passes through a hole in the bracket 115. A right-angle crank 121 is welded or otherwise secured to the motor shaft 119.

Pivotally connected to the bracket 115 is a rod 125. The rod 125 has a long portion 126, which may be bent as at reference numeral 128. At a first end of the rod is a right-angle end 123. The rod end 123 is pivotally connected by a bushing 122 to the bracket 115. Near the end 123 of the rod 125 is a channel-shaped loop 127. The loop 127 is joined to the rod long portion 126 so as to create a slot 129. The motor crank 121 fits in the slot 129. Activation of the motor 113 causes the crank to rotate and to slide within the slot 129. The result is that the rod 125 oscillates about its first end 123 in the directions of arrows 131.

Removably pushed on the distal end 133 of the rod long portion 126 is one end 134 of a flexible tube 135. The tube 135 is slit diametrically through its wall from its second end 136 to approximately the rod distal end 133 with a slit 137. The slit 137 is wider than the thickness of the fishing line 101. The fishing line is placed within the tube slit 137. A depth finding marker such as a bobber 139 or split shot is tied to the fishing line above the tube 135. The fishing line below the tube, as well as the bait, hook, and sinker, not shown, are supported on the tube by means of the bobber 139. It is an important feature of the invention that different stiffness tubes can be interchangeably pushed on the rod.

Mechanical Alert

To enable a fisherman to visually learn of a fish strike while using the ice fishing system 1, the mechanical alert 19 is located on the top wall 31 of the housing 7. The mechanical alert is composed of a coil spring 141 having a fixed end 143 and a movable end 145. The fixed end 143 of the spring 141 is secured to the housing, as by fitting tightly over the shank 147 of a bolt 149. The head 151 of the bolt 149 is inside the housing. The bolt is held in place by a nut and washer 153 on the outside of the housing. One end of a copper strip 155 is interposed between the bolt head 151 and the housing top wall. Pressed on the movable end 145 of the spring 141 is one end of a post 157. On the other end of the post 157 is a bright flag 159.

Normally the spring 141 is undeflected, as shown in FIG. 1, such that the post 157 is in a vertical attitude. By pushing the post laterally, the spring bends to enable the post to attain a horizontal attitude, FIGS. 2 and 4. The shaft 93 and trip bar 103 of the reel mechanism 113 can be rotated together and the spring can be bent to place the post under the trip bar, FIGS. 2 and 3.

Electrical Control and Alert

The electrical alert 21 enables a night fisherman to see whether a fish has struck. The electrical alert comprises a lens assembly 161 on the outside of the housing top wall 31. Lamps inside the lens assembly 161 are electrically connected to the mechanical alert bolt 149 by a copper strip 155. A wire 162 also leads from the lens assembly.

As illustrated, the electrical alert 21 also includes a U-bolt 163 that is fastened to the housing top wall 31 by nuts 165. The U-bolt 163 is located close to the spring 141 such that the spring contacts the U-bolt when the spring is undeflected, FIG. 1. A tab 166 held by a U-bolt nut 165 receives an electrical clip 167 of a related wire 169.

The electrical control 17 may be powered by any suitable source of electrical power, such as a solar panel on the outside of the housing. However, I prefer that the electrical control be powered by batteries 171 held in a suitable holder 173. The wires 162 and 169 connect to the battery holder 173 to make a complete circuit through the wires and the batteries 171.

The electrical control 17 also includes a circuit board 175 mounted to the housing side wall 27. The circuit board 175 is connected to the battery holder 173 to be powered by the batteries 171. A three-position switch 177 is part of the electrical control. The circuit board and switch 177 are designed to control the electric motor 113 through wires 179. For a first position of the switch, the motor is not activated. For a second switch position, the motor is continuously activated. For a third switch position, the motor is operated intermittently.

Operation

In use, the ice fishing system 1 is placed over a hole 3 in the ice 5. The housing back wall 25 is placed facing the wind. If it is cold enough for the hole to freeze over, the burner 75 is lit. The vent 56 is opened the correct amount for the prevailing conditions. A tube 135 is chosen that is appropriate for the particular kind of fish to be caught. Specifically, a relatively stiff tube is used for trophy fish, which strike the bait hard. A more limber tube is used for fish such as pan fish, which more gently attack the bait. The line guide 109 is also selected that suits the particular fish. A relatively stiff line guide is selected for hard-striking fish, and a relatively limber line guide is used for easy-striking fish.

The motor 113 is activated to place the rod 125 in its lowermost position. The desired hook and sinker are tied on the end of the fishing line 101. The fishing line is unwound from the reel 99 until the hook is at the proper depth in the water. The fishing line is slipped into the slit 137 in the tube 135. The bobber 139 or other depth finding marker is tied to the fishing line above the tube such that the weight of the fishing line below the bobber, as well as the hook and sinker, is borne through the bobber on the tube.

The trip bar 103 and shaft 93 are rotated such that the trip bar is parallel to the housing side walls 27 and 29. The post 157 is pushed to bend the spring 141 and enable the post to attain a generally horizontal attitude underlying the trip bar. The restoring force of the spring 141 toward its undeflected condition is determined by the location of the trip bar 103 and thus of the sleeve 89 relative to the housing top wall 31. The set screw 91 is loosened to enable the sleeve to be moved up and down in the housing top wall. For hard-striking fish, the sleeve is pushed further down inside the housing 7. For easy-striking fish, the sleeve is pulled farther out of the housing top wall. The set screw is retightened after the sleeve is at the desired setting. Since the spring is not in contact with the U-bolt 163, the circuit to the lens assembly 161 is open. Although not shown, the sturdy design and construction of the lid 9 enables the fisherman to kneel on the open lid while preparing the ice fishing system 1 for action.

When everything is ready, the fisherman turns on the switch 177 to the desired position for either steady or intermittent oscillation of the rod 125. He closes the lid 9, locks the lock 38, and waits for a fish to strike. The motor 113 causes the rod 125 and tube 135 to jiggle the bait in a realistic manner.

It will be noticed that the angular speed of the rod 125 is not the same in both directions of oscillation. Assuming the motor 113 rotates the crank 121 in the direction of arrow 181, the speed of the rod is slower when the rod is rotating in the clockwise direction with respect to FIG. 3 about the bearing 122 than when the rod is rotating in the counter-clockwise direction. The resulting uneven reciprocating speed on the fishing line 101 and hook contributes to a realistic presentation of the bait to the fish.

The fisherman is able to see through the lid window 45 to check the jigging operation. He is also able to see the thermometer 54 to check the interior temperature of the housing 7. He can adjust the vent 56 for more or less air to the heat exchanger burner 75 as necessary. Air entering the housing flows through the hole 71 in the bottom plate 63 to the burner. Hot air from the burner flows through the holes 73 in the middle shelf 67 into the hood 81. The air flow around the heat exchanger, as represented by arrows 183, helps keep the components inside the housing warm. The hot air in the hood, especially, contributes to keeping the housing interior warm. In addition, the heat exchanger plates 55, 57, 63, 65, 67, and 77 radiate heat from the burner to the other components inside the housing 7. During night fishing, the burner 75 illuminates the interior of the housing through the door 83. The highly polished heat exchanger plates enhance the illumination.

When a fish strikes the bait and pulls the fishing line 101, the reel 99 and the trip bar 103 rotate. Rotating the trip bar releases the post 157. The spring 141 returns to its undeflected condition of FIG. 1. The flag 159 alerts the fisherman of the strike. The spring contacts the U-bolt 163 to close the circuit through the lens assembly 161. The lamps inside the lens assembly glow, which alert a night fisherman.

To retrieve the fish, the fisherman opens the lid 9. He flips the switch 177 off to stop the jigging mechanism 115. The fisherman can safely and comfortably kneel on the lid as he removes the fish. If desired, he can put a different jigging tube 135 on the rod 125. He adjusts the lamp 75 and/or vent 56. When all is again ready, he closes the lid 9 and locks it with the lock 38. The ice fishing system 1 is then ready to catch another fish.

When the fisherman is done fishing, he winds the fishing line 101 on the reel 99. He can stick the fish hook in the foam block 50. After raising the door 83, he removes the lamp 75 from the heat exchanger 11. He recloses the door 83 and the lid 9, which is locked with the lock 38. He rotates the trip bar 103 and places the post 157 under the trip bar. A flexible rubber ring 185 captured on the post is looped over the trip bar to keep the post in place under the trip bar. The fisherman can then take the ice fishing system 1 home, using the recess 34 in the housing front wall 23 to comfortably carry the housing 7.

In summary, the results and advantages of the sport of ice fishing can now be more fully realized. The ice fishing system 1 provides both exceptional convenience for ice fishing as well as increased probability of success. This desirable result comes from using the combined features of the heat exchanger 11 and the jigging mechanism 15. The heat exchanger warms the inside of the housing 7 by both radiation from the heat exchanger and by conduction of the air 183 flowing around it. The highly polished plates 55, 57, and 63 reflect light from the burner 75 through the clear door 83 to the inside of the housing for night fishing. The door pane 85 allows illumination inside the housing while preventing wind from blowing out the burner. The vent 56 controls the amount of air to the burner. The jigging mechanism utilizes the constant speed motor 113 with the crank 121 to produce a variable oscillating speed on the rod 125, which produces a realistic motion on the fishing line and bait. The electrical control 17 is settable for different fishing line actions. Both the jigging mechanism tube 135 and the reel mechanism line guide 109 are changeable to suit the habits of different kinds of fish. A fish strike results in the fisherman being alerted by both the mechanical alert 19 and the electrical alert 21. The entire ice fishing system is designed to maximize fishing enjoyment and success.

It will also be recognized that in addition to the superior performance of the ice fishing system 1, its construction is such as to be of modest cost in relation to the benefits it provides. Also, since it is made of sturdy materials and a rugged design, it gives long service life with minimal maintenance.

Thus, it is apparent that there has been provided, in accordance with the invention, a ice fishing system that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. Apparatus for fishing through the ice comprising:
 a. a housing having a top wall and at least one side wall that cooperate to define a housing interior;
 b. lid means for selectively opening and closing to provide and prevent, respectively, access to the housing interior;
 c. heat exchanger means for providing illumination and heat to the housing interior;
 d. a reel mechanism in the housing top wall and including a fishing line;
 e. means for jigging the fishing line comprising:
  i. a rod that oscillates inside the housing interior;
  ii. a flexible tube on the rod having a slit therethrough that receives the fishing line; and
  iii. means for supporting the fishing line on the flexible tube and thereby enabling the fishing line to reciprocate in response to oscillating the rod; and
 f. means for alerting a fisherman of a strike on the fishing line.

2. The apparatus of claim 1 wherein the flexible tube is selected from a plurality of tubes having respective different flexibilities, the selected flexible tube having a flexibility that suits the particular kind of fish to be caught.

3. The apparatus of claim 1 wherein the heat exchanger means comprises:
 a. a combustion chamber having an open front;
 b. a hood above the combustion chamber;
 c. a transparent door slidable to selectively open and close the combustion chamber open front; and
 d. burner means in the combustion chamber for producing heat and light to the housing interior.

4. The apparatus of claim 3 wherein the combustion chamber and hood have common side plates that are spaced from said at least one housing side wall to define air passages between the heat exchanger and said at least one housing side wall.

5. The apparatus of claim 3 wherein the heat exchanger means further comprises a middle shelf between the combustion chamber and the hood, the middle shelf defining at least one opening therethrough that enables heat from the burner means to rise from the combustion chamber into the hood.

6. The apparatus of claim 1 wherein the reel mechanism comprises:
 a. a sleeve passing vertically through the housing top wall;
 b. a shaft that rotates about a vertical axis within the sleeve and having a first end inside the housing interior and a second end outside the housing; and
 c. a reel on the shaft first end on which the fishing line is wound.

7. The apparatus of claim 6 wherein the reel mechanism further comprises a line guide hung from the housing top wall over which the fishing line is draped, the line guide having a selected flexibility to produce a desired bending of the line guide in response to a fish strike on the fishing line.

8. The apparatus of claim 6 further comprising:
 a. a trip bar on the shaft second end; and
 b. a first spring between the sleeve and the trip bar, the weight of the reel, shaft, and trip bar being supported on the first spring.

9. The apparatus of claim 6 wherein:
 a. the means for alerting a fisherman of a strike comprises a second spring fixed to the housing top wall and a post pressed into the second spring, the second spring being bendable from an undeflected condition to a generally horizontal attitude to place the post under the trip bar and thereby create a restoring force of the second spring toward the undeflected condition thereof; and
 b. the location of the sleeve in the housing top wall is adjustable to thereby adjust the location of the trip bar relative to the housing top wall,
  so that the restoring force on the second spring toward the undeflected condition thereof is determined by the location of the sleeve in the housing top wall.

10. A fishing system for use on ice comprising:
 a. a housing having at least one wall that defines a housing interior;
 b. means for selectively providing access to the housing interior;
 c. a heat exchanger in the housing interior comprising:
  i. first and second side plates fastened to the housing;
  ii. a bottom plate and a middle shelf both joined to the side plates and cooperating therewith to define a combustion chamber with an open front;
  iii. a burner on the bottom plate; and
  iv. a clear door slidable within the side plates to selectively slide between a lower position whereat the combustion chamber open front is closed and a raised position whereat the combustion chamber open front is partially open;
 d. a reel mechanism in the housing comprising a reel in the housing interior and mounted to a shaft that rotates about a vertical axis and a fishing line being wound on the reel;

e. means for jigging the fishing line; and f. means for alerting a fisherman of a strike on the fishing line.

11. The fishing system of claim 10 wherein:

a. the housing is generally rectangular in shape and the at least one wall comprising front, side, top, and back walls that define the housing interior;

b. the means for selectively providing access to the housing interior comprises a lid hinged to the housing front wall; and c. the reel mechanism is in the housing top wall.

12. The fishing system of claim 11 wherein:

a. the housing front, side, and back walls define a common bottom surface; and b. the housing further comprises a plurality of pads in the housing interior corners, the pads extending below the common bottom surface of the housing front, side, and back wall, so that the pads are in contact with the ice when the housing is placed on the ice for fishing with the fishing system.

13. The fishing system of claim 12 wherein the pads are triangularly shaped.

14. The fishing system of claim 12 wherein the heat exchanger bottom plate is spaced above one of said housing pads.

15. The fishing system of claim 11 wherein:

a. the lid has a free edge that rests on the ice when the lid is in an open configuration; and b. the lid comprises a double pane window having an area that is small relative to the area of the lid, the lid being sufficiently strong to support a fisherman kneeling on the lid when the lid is in the open configuration.

16. The fishing system of claim 15 further comprising a thermometer on the housing back wall and located in a line of sight through the window in the lid when the lid is in a closed configuration, so th at a fisherman can see the thermometer through the lid window without having to open the lid.

17. The fishing system of claim 11 wherein:

a. the heat exchanger first side plate is fastened to the housing back wall, and the heat exchanger second side plate is fastened to a housing side wall; and b. the heat exchanger first and second side plates are spaced from the housing back and side walls, respectively, to thereby enable air to flow between the heat exchanger side plates and the associated housing walls.

18. The fishing system of claim 17 wherein:

a. the heat exchanger side plates are formed with inwardly facing coplanar tabs; and b. the heat exchanger side plate tabs and top wall cooperate to define a space that slidingly receives the door.

19. The fishing system of claim 11 wherein the reel mechanism further comprises:

a. a sleeve passing through and held to the housing top wall, the sleeve rotatably receiving the shaft, the reel being mounted to a lower end of the shaft;

b. a trip bar assembled to an upper end of the shaft outside the housing; and c. a first spring interposed between the sleeve and the trip bar, the spring supporting the weight of the reel, shaft, and trip bar on the sleeve.

20. The fishing system of claim 19 further comprising means for adjustably holding the sleeve in the housing top wall, so that the location of the trip bar is adjustable relative to the housing top wall.

21. The fishing system of claim 20 wherein the means for alerting a fisherman of a strike comprises:

a. a second spring having a first end fixed to the housing top wall and a second end, the second spring having a generally vertical attitude when the spring is in an undeflected condition;

b. a post having a first end pressed in the second end of the second spring, the post having a generally vertical attitude when the second spring is in the undeflected condition, the post being pushable to bend the second spring and enable the post to attain a generally horizontal attitude under the reel mechanism trip bar; and c. ring means captured on the post for selectively keeping the post in place under the trip bar.

22. The fishing system of claim 11 wherein the reel mechanism further comprises a line guide hung from the housing top wall in the housing interior, the fishing line draping over the line guide, the line guide having a flexibility that produces a selected amount of bending in the line guide when a fish strikes the fishing line.

23. The fishing system of claim 10 wherein the heat exchanger first and second side plates are spaced from said at least one housing wall to thereby enable air to flow between the heat exchanger side plates and said at least one housing wall.

24. The fishing system of claim 10 wherein the heat exchanger bottom plate defines a plurality of holes therethrough that enable air to enter the combustion chamber.

25. The fishing system of claim 10 wherein the heat exchanger further comprises:

a. a top plate joined to the side plates; and b. a front plate joined to the side plates and the top plate and cooperating therewith and with the middle shelf to define a hood, the middle shelf having at least one hole therethrough that enables hot air from the burner to pass through said at least one hole in the middle shelf into the hood.

26. The fishing system of claim 25 wherein the heat exchanger top and bottom plates and middle shelf are triangularly shaped.

27. The fishing system of claim 10 wherein the means for jigging the fishing line comprises:

a. a bracket joined to said at least one housing wall in the housing interior;

b. a motor fastened to the bracket and having a motor shaft;

c. a crank joined to the motor shaft;

d. a rod having a first end pivotally connected to the bracket and a second end, the rod including a slot that receives the motor crank;

e. a flexible tube removably pushed on the rod second end, the flexible tube having a slit therein that receives the fishing line; and f. a bobber tied to the fishing line adjacent the flexible tube and between the flexible tube and the reel, so that activating the motor causes the rod to oscillate about its first end and thereby jig the fishing line.

28. The fishing system of claim 27 wherein the flexible tube is selected from a number of tubes of different flexibilities to suit a particular kind of fish to be caught.

29. A method of catching fish through ice comprising the steps of:

a. placing a housing having walls that define an interior over a hole in the ice;

b. unwinding a predetermined length of fishing line from a reel inside the housing and dropping the fishing line through the hole in the ice;

c. placing the fishing line in a slit of a flexible tube in the housing interior;

d. supporting the fishing line on the flexible tube; and e. oscillating the flexible tube and thereby producing realistic jigging of the fishing line.

30. The method of claim 29 comprising the further steps of:

a. draping the fishing line over a line guide between the reel and the flexible tube; and b. allowing the fishing line to bend the line guide in response to a strike on the fishing line.

31. The method of claim 30 comprising the further step of selecting the line guide to having a predetermined flexibility that suits the kind of fish to be caught.

32. T he method of claim 29 wherein the step of oscillating the flexible tube comprises the steps of pressing the flexible tube on a rod, and oscillating the rod.

33. The method of claim 29 wherein the step of oscillating the flexible tube comprises the steps of oscillating the flexible tube in a firs t direction at a first speed, and oscillating the flexible tube in a second direction opposite the first direction at a second speed different than the first speed.

34. The method of claim 29 wherein the step of placing the fishing line in a slit of a flexible tube comprises the step of selecting the flexible tube to having a predetermined flexibility that suits the particular kind of fish to be caught.

35. The method of claim 29 wherein the step of placing a housing on the ice comprises the steps of:

a. providing the housing having a lid that is hinged to the housing;

b. opening the lid and thereby providing access by a fisherman to the housing interior; and c. supporting the weight of the fisherman kneeling on the lid as the fisherman unwinds the fishing line from the reel and places the fishing line in the slit in the flexible tube an d supports the fishing line on the flexible tube.

36. The method of claim 29 comprising the further steps of:

a. providing a heat exchanger having side plates and an open front;

b. fastening the heat exchanger side plates to selected housing walls; and c. providing air passages between the heat exchanger side plates and the selected housing walls.

37. The method of claim 36 wherein the step of providing the heat exchanger comprises the steps of:

a. constructing the heat exchanger side plates to define a combustion chamber with an open front; and b. sliding a transparent door to selectively open and close the combustion chamber open front.

* * * * *